United States Patent
Steffler et al.

(10) Patent No.: US 6,875,267 B2
(45) Date of Patent: Apr. 5, 2005

(54) PROCESS AND DEVICE FOR FEEDING DISPERSIBLE SOLID FUELS INTO THE CALCINATOR OF A CEMENT CLINKER PRODUCTION LINE

(75) Inventors: Claus-Jürgen Steffler, Lohmar (DE); Wolfgang Müller, Monheim am Rhein (DE); Stefan Köllen, Frechen (DE)

(73) Assignee: KHD Humboldt Wedag AG, Cologne (DE)

( * ) Notice: Subject to any disclaimer, the term of this patent is extended or adjusted under 35 U.S.C. 154(b) by 85 days.

(21) Appl. No.: 10/291,082

(22) Filed: Nov. 8, 2002

(65) Prior Publication Data
US 2003/0089282 A1 May 15, 2003

(30) Foreign Application Priority Data
Nov. 10, 2001 (DE) .......................................... 101 55 407

(51) Int. Cl.[7] ................................................. C04B 7/36
(52) U.S. Cl. ....................... 106/739; 106/745; 106/758; 106/760; 106/764; 106/771
(58) Field of Search ................................. 106/739, 745, 106/758, 760, 764, 771

(56) References Cited

U.S. PATENT DOCUMENTS

| | | | | |
|---|---|---|---|---|
| 4,238,237 A | * | 12/1980 | Jarrett et al. | |
| 4,913,742 A | * | 4/1990 | Kwech | 431/5 |
| 5,122,189 A | * | 6/1992 | Garrett et al. | 106/745 |
| 5,156,676 A | * | 10/1992 | Garrett et al. | 106/745 |
| 5,496,404 A | * | 3/1996 | Price et al. | 106/407 |
| 6,287,379 B1 | * | 9/2001 | Khalifeh | 106/745 |
| 6,391,107 B1 | * | 5/2002 | Reimann et al. | 106/739 |

* cited by examiner

*Primary Examiner*—Paul Marcantoni
(74) *Attorney, Agent, or Firm*—Sonnenschein Nath & Rosenthal

(57) ABSTRACT

In order to make sure, for cement clinker production lines with blown injection of dispersible solid fuels such as, for example, coal dust, into the calcinator which is provided with fuel, that an open flame does not occur at the fuel injection point, it is proposed according to the invention that the fuel is fed into a meal intake box that has a sloping raw meal chute and deflector slide and is arranged on the outside of the calcinator and connected to it through a wall opening and the fuel is pre-mixed with the pre-heated raw meal there, and then introduced via the deflector slide into the reaction section of the calcinator in order to form a gas-raw meal-solid fuel-suspension that is uniformly distributed.

10 Claims, 2 Drawing Sheets

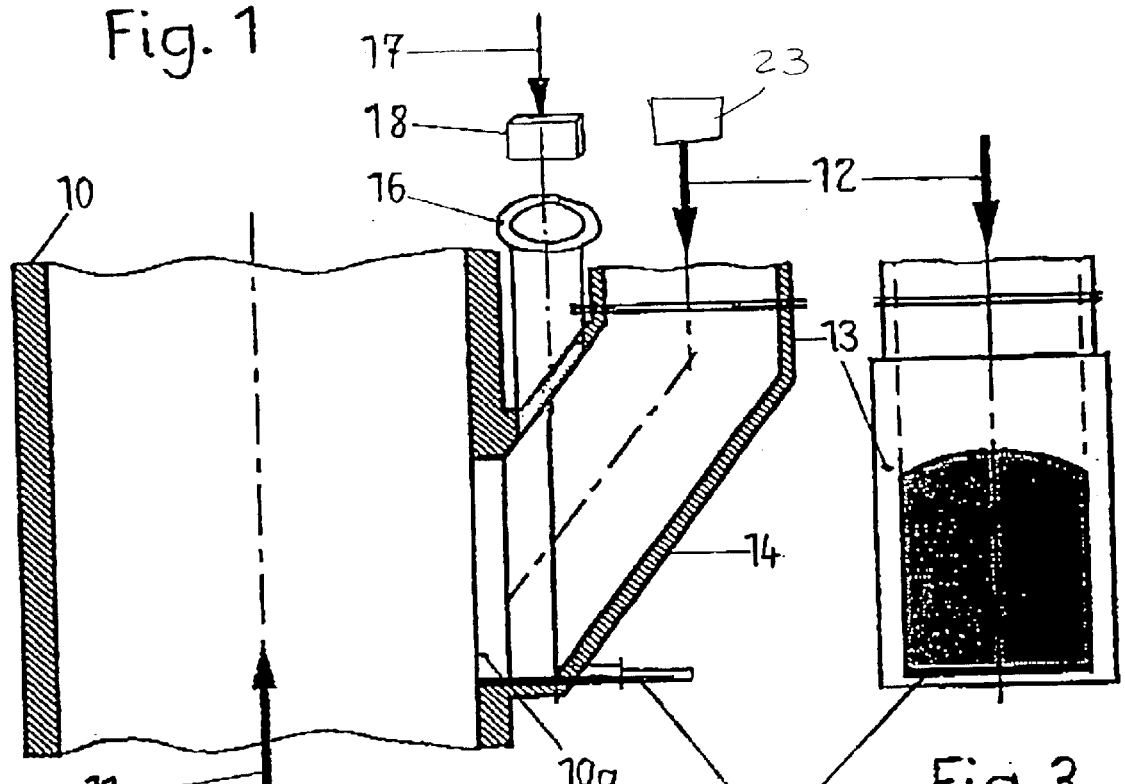
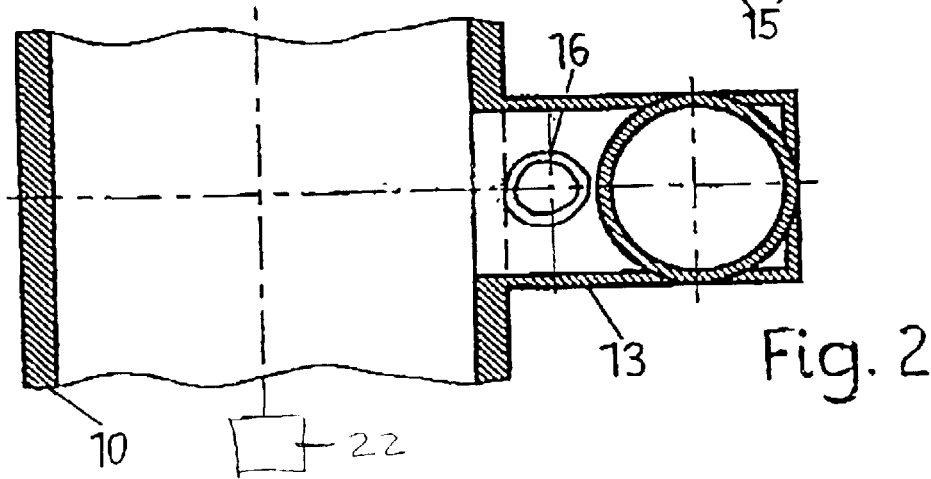

PROCESS AND DEVICE FOR FEEDING DISPERSIBLE SOLID FUELS INTO THE CALCINATOR OF A CEMENT CLINKER PRODUCTION LINE

BACKGROUND OF THE INVENTION

The invention involves a process for feeding dispersible solid fuels, such as coal dust, into the calcinator of a system for manufacturing cement clinkers made of cement raw meal, which is preheated in a heat exchanger system, calcinated in the calcinator provided with the fuel and baked into cement clinker in a rotary tubular kiln, whereby the pre-heated cement raw meal is fed into the reaction section of the calcinator via a meal intake box that has a sloping raw meal chute and deflector slide and is arranged on the outside of the calcinator and connected to it through a wall opening. In addition, the invention involves a device for performing the process.

Cement clinker production lines of the type named above must be able to generate, in the calcinator equipped with a secondary firing (in addition to the rotary kiln firing), a high-grade calcinated raw meal prior to introduction into the rotary tubular kiln. In the process, large quantities of fuel must be burned in the calcinator, in order to be able to perform the highly exothermic calcination reactions (specific heat consumption 550 kcal/kg clinker at a total heat consumption of approx. 800 kcal/kg cement clinker). As a calcinator reactor, the rotary kiln exhaust gas line that ascends at first in a manner that approaches vertical is used, which usually is deflected by 180° into a descending pipeline branch, which opens into the lowermost cyclone of the cyclone suspension-type heat exchanger system for the purpose of separating the calcinated raw meal from the exhaust gas stream.

The pre-heated raw meal from the next to last cyclone stage of the cyclone suspension-type heat exchanger system and the calcinator fuel are fed, into the reaction section of the rotary kiln exhaust gas channel, the fuel combusting with excess oxygen out of the rotary kiln exhaust gas and/or with the oxygen from the tertiary air introduced from the clinker cooler. Last, but not least for cost considerations, the calcinator fuel often consists of dispersible solid fuels such as coal dust, for example, which is blown in via a pipeline into the reaction section of the calcinator.

For a uniform progression of the combustion reaction and the calcination reaction running parallel to it, a uniform distribution of the raw meal and the fuel in the reaction section of the calcinator is important. Of course, developmental efforts have been focused on distributing the pre-heated cement raw meal out of the second lowest cyclone stage of the cyclone suspension-type heat exchanger system uniformly over the cross-section of the reaction section of the calcinator, whereby the pre-heated raw meal is introduced into the reaction section of the calcinator via a meal intake box that has a sloping raw meal chute and an adjustable deflector slide and is arranged on the outside of the calcinator and connected to it through a wall opening (Publication "KHD SYMPOSIUM '92 Volume 2 Modem Combustion Technology" of the KHD Humboldt Wedag AG company, 1993, Article "Development Trends in the Clinker Combustion Process" by C. Bauer, pages 11 to 15, FIG. 3). However, it has been observed that when, as has been customary until now, the coal dust injection point of the calcinator reactor is arranged displaced opposite from or at least to the side of the raw meal feed point and the solid fuel is not optimally distributed over the cross-section of the calcinator, the danger can not be ruled out that an open flame occurs on the coal dust injection point in the calcinator (also see DE-B-25 10 312), which leads to local overheating with material molten phase formation and undesired material caking, i.e., it was thus far not always ensured that the solid fuel, such as coal dust, for example, oxidizes and/or burns in a flameless manner in the gas-raw meal suspension.

SUMMARY OF THE INVENTION

According to the invention, the fuel, such as, for example, coal dust, is blown at first into the meal intake box that has the sloping raw meal chute and deflector slide and is arranged on the outside of the calcinator and connected to it through a wall opening, and there it is pre-mixed with the pre-heated raw meal located there, whereupon the mixture of raw meal and coal dust is introduced via the deflector slide into the reaction section of the calcinator in order to form a gas-raw meal-solid fuel-suspension that is uniformly distributed over the calcinator cross-section, in which the fuel oxidizes and/or burns in a flameless manner in the presence of oxygen out of the rotary kiln exhaust gas and/or out of the tertiary air introduced from the clinker cooler. The pre-mixed raw meal-coal dust-suspension does not allow the formation of an open flame. In the process, the calcinator fuel can be burned hyperstoichiometrically with an oxygen excess, or even substoichiometrically with an oxygen deficiency, for the purpose of generating a CO-containing reduction zone in order to reduce the hazardous material $NO_x$ contained in the rotary kiln exhaust gas. In both cases, a desired flameless combustion of the calcinating fuel can be ensured.

Associated with the blown injection of the solid fuels into the meal intake box is a constant cleaning of the adjustable deflector slide installed there. A cleaned deflector slide is an essential prerequisite for a uniform distribution of the raw meal (and the solid fuel) over the calcinator cross-section.

The blown injection of the dispersible solid fuels into the meal intake box must not occur in such a way that by the higher speed of the pneumatic conveying air of the fuel, the solid suspension is blown into the calcinator onto the calcinator wall that is opposite the intake point. Thus, according to an additional characteristic of the invention, the conveyance speed of the pneumatic transport of the solid fuel, for example approximately 25 m/sec prior to intake into the meal intake box, is advantageously reduced. The average flow speed in the tubular calcinator itself is only approximately 16 m/sec.

A device according to the invention for performing the process is characterized in that the meal intake box has at least one nozzle for blowing in the solid fuel, such as, for example, coal dust, for the pre-mixing of the solid fuel with the pre-heated raw meal prior to the introduction of the mixture into the reaction section of the calcinator. In the process, the nozzle and/or the nozzle(s) is(are) arranged in order to blow in the coal dust at the top and/or on the side on the meal intake box.

BRIEF DESCRIPTION OF THE DRAWING

The invention and its additional characteristics and advantages are explained in greater detail using the embodiment example shown schematically in the drawings.

FIG. 1 is in a section view, a vertical section through a tubular calcinator of a cement clinker production line with a meal intake box arranged on the outside of the calcinator.

FIG. 2 is in a section view, a top view of FIG. 1.

FIG. 3 shows the view into the inside of the meal intake box with a quantity of hot raw meal that slides down over the sloping raw meal slide.

DETAILED DESCRIPTION OF THE PREFERRED EMBODIMENT

Figure 4:
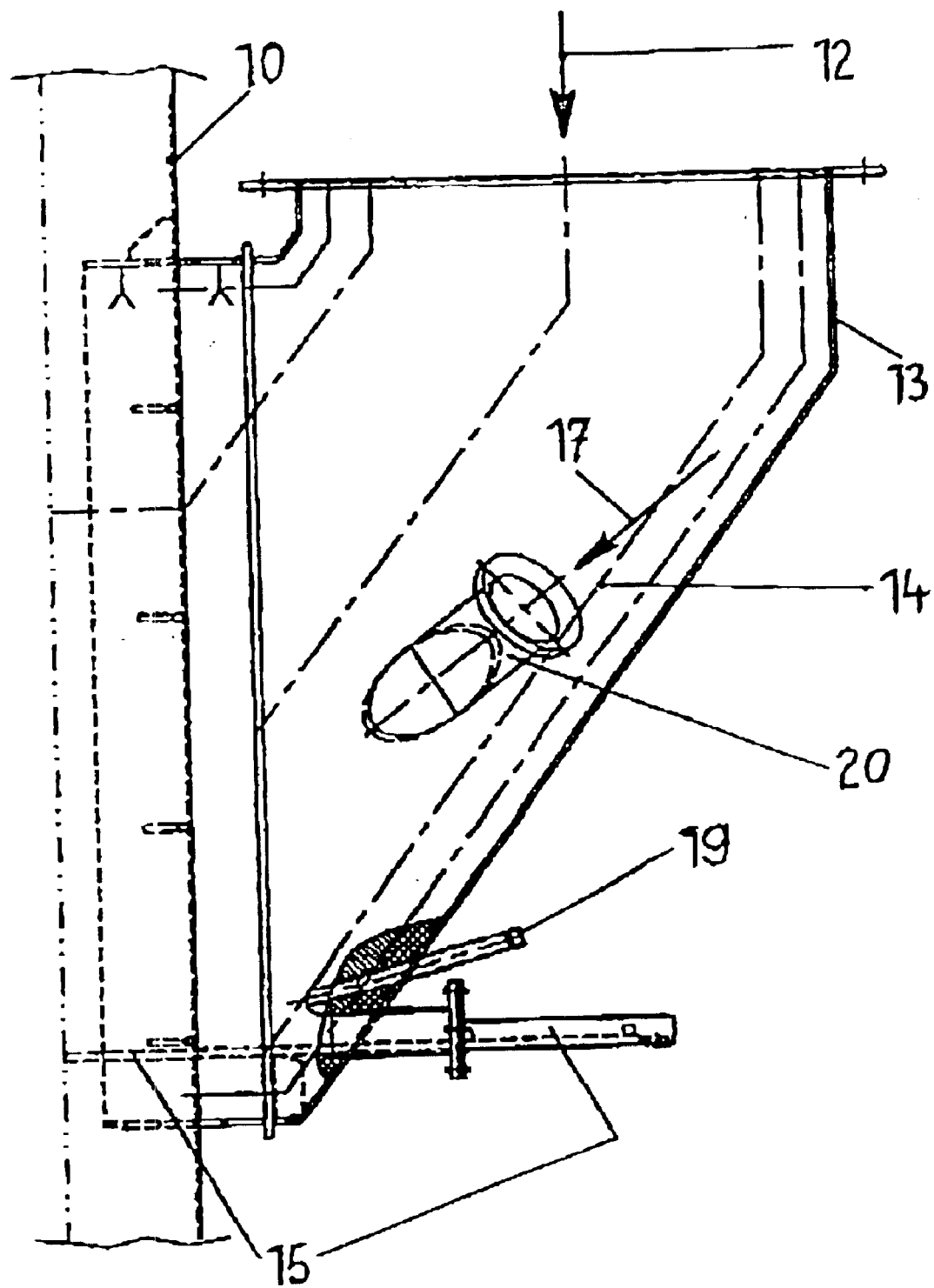
FIG. 4 shows a variation to FIG. 1, a somewhat different configuration of the meal intake box with side injection of dispersible solid fuels.

FIG. 1 shows, in a section view, the pre-calcinator of a cement clinker production line, with a rotary kiln exhaust gas channel 10 that is conducted from the bottom to the top of a material intake housing of a rotary tubular kiln 22 and leads upwards to the lowest cyclone of a cyclone suspension-type pre-heater system 23 for the pre-heating of the cement raw meal. Such an overall system is disclosed in U.S. Pat. No. 6,447,598, the disclosure of which is incorporated herein by reference. The pre-heated raw meal stream 12 separated out in the next to last (second lowest) cyclone from the exhaust gas stream 11 is introduced via a meal intake box 13 arranged on the outside on the rotary kiln exhaust gas channel 10 via its sloping raw meal slide 14 and via its deflector slide 15 through a wall opening 10a of the rotary kiln exhaust gas channel into the reaction section of the pre-calcinator and there it is uniformly distributed through the adjustment of the adjustable deflector slide 15 in the exhaust gas stream 11. The material sliding down in the meal intake box 13 over the raw meal slide 14 and distributed via the adjustable deflector slide 15 is shown in FIG. 3 as a black area.

As shown in FIGS. 1 and 2, the meal intake box 13 has, for example, in the gusset area between the raw meal intake into the calcinator and the rotary kiln exhaust channel 10, at least one nozzle 16 directed to the top, through which a dispersible solid fuel 17, for example coal dust, is blown into the meal intake box 13 in order to pre-mix the coal dust 17 with the pre-heated raw meal 12 prior to the introduction of the mixture into the reaction section of the calcinator. Whereas the open cross-section of the rotary kiln exhaust gas channel 10 used as a pre-calcinator is, for example 6 to 8 m$^2$, the open cross-sectional area in the meal intake box 13 is, to the contrary, dimensioned small, with e.g. 1 m$^2$, that is, the suspension density of the solid mixture made of the pre-heated cement raw meal 12 and coal dust 17 is high there, so that an open flame can not form in either the meal intake box or the calcinator itself.

A good mixture of the coal dust 17 with the raw meal stream 12 occurs in the area 14/15 before opening 10a and this mixture is distributed uniformly over the cross-section of the calcinator reactor 10, whereby the fuel combusts in the reaction section of the calcinator in a flameless manner and a high-grade raw meal calcination takes place.

For substoichiometric fuel combustion, a cloud containing CO and extending upwards from the burning point and/or wall opening 10a can be generated in the rotary kiln exhaust channel 10, which reduces, in an effective manner, NO$_x$ compounds, which come out of the rotary tubular kiln, and prevents these NO$_x$ compounds from getting into the upper areas of the calcination system according to the invention, where they could be emitted.

Although the average speed of the exhaust gas stream 11 in the rotary kiln exhaust gas channel 10 is 16 m/sec, for example, the conveyance speed of the pneumatic conveyance of the coal dust 17 is higher, at 25 m/sec, for example. So that by this higher speed of the coal dust injection into the meal intake box 13, the raw meal is not accelerated onto the inner wall of the rotary kiln exhaust gas channel 10 opposite the injection point, the conveyance speed of the pneumatic transport of the coal dust 17 is advantageously reduced prior to the intake into the meal intake box 13, and specifically, by a deflector disk 18 connected upstream, for example. By the coal dust injection into the meal intake box 13, not only is the mixture of raw meal and coal dust as uniformly distributed as possible in the exhaust gas stream 11, but the deflector slide 15 is simultaneously also cleaned of material deposits so that the compressed air nozzles 19 arranged above the deflector slide 15 seen in FIG. 4 must not be activated as often to clean off the deflector plate.

Although according to the embodiment example of FIGS. 1 and 2, the coal dust 17 is injected from above into the meal intake box 13, it is blown from the side into the meal intake box 13 according to the embodiment example of FIG. 4, whereby the one or both of the opposing nozzles 20 is/are arranged on the side on the meal intake box 13 to inject the coal dust.

For the purpose of optimal mixing of the coal dust 17 with the raw meal 12 and the uniform distribution in the calcinator, the nozzles 16 and/or 20 can still be equipped with a joint for angular adjustment to inject coal dust.

Instead of or also in addition to the rotary kiln exhaust gas channel 10, the tertiary air channel coming from the cement clinker cooler can also be used as a pre-calcinator and equipped with the meal intake box 13 according to the invention. The entire fuel quantity required for pre-calcination of the cement raw meal does not need to be introduced via the meal intake box 13 into the reaction section of the calcinator, but instead it can also be sufficient that at least one partial stream of the calcinating fuel is introduced into the calcinator on the path according to the invention via the meal intake box 13 and the remaining calcinating fuel quantity is introduced into the calcinator in the conventional manner, only if it is achieved on the whole that the entire quantity of solid fuel required for calcination is optimally distributed over the calcinator cross-section and burns in a flameless manner without forming an open flame.

As dispersible solid fuels that can be fed into the calcinator of a cement clinker production line, instead of coal dust, alternative fuels can also be used, such as, for example, pre-reduced synthetic material, rubber material, wood material, etc.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A process for feeding dispersible solid fuels into a calcinator of a cement clinker production line where cement clinkers are made of cement raw meal, which raw meal is preheated in a heat exchanger, calcinated in the calcinator provided with the fuel and baked into cement clinker in a rotary tubular kiln, whereby the pre-heated cement raw meal is fed into the reaction section of the calcinator via a meal intake box that has a sloping raw meal chute and deflector slide and is arranged on the outside of the calcinator and connected to it through a wall opening, The steps comprising:

feeding the fuel into the meal intake box and pre-mixing the fuel with the pre-heated raw meal there into a mixture, and then introducing the mixture via the deflector slide into the reaction section of the calcinator in order to form a gas-raw meal-solid fuel-suspension that is uniformly distributed.

2. The process according to claim 1, wherein the fuel is transported pneumatically and a conveyance speed of the pneumatic transport of the fuel is reduced prior to entry into the meal intake box.

3. A process for feeding dispersible solid fuel into a calcinator of a cement clinker production line where cement clinkers are made of cement raw meal, comprising the steps:

preheating the cement raw meal in a heat exchanger, feeding the pre-heated cement raw meal into a meal intake box, feeding the fuel into the meal intake box, pre-mixing the fuel with the pre-heated raw meal in the meal intake box into a mixture, and introducing the mixture into the reaction section of the calcinator in order to form a uniformly distributed gas-raw meal-solid fuel-suspension.

4. A process according to claim 3, wherein said dispersible solid fuel comprises coal dust.

5. A process according to claim 3, wherein the fuel is transported to the meal intake box pneumatically.

6. A process according to claim 5, wherein the fuel is introduced into the meal intake box via a nozzle.

7. A process according to claim 5, wherein a conveyance speed of the pneumatic transport of the fuel is reduced prior to entry into the meal intake box.

8. A process according to claim 3, wherein the mixture is introduced into the reaction section of the calcinator at a rate so as to allow for a flameless combustion of the fuel in the calcinator.

9. A process according to claim 3, wherein the pre-heated raw meal and the fuel are fed into the meal intake box at a rate sufficient to form a suspension density that will prevent an open flame from forming in the meal intake box.

10. A process according to claim 3, wherein the meal intake box includes a deflector slide for diverting the pre-heated raw meal into the calcinator, and the fuel is fed into the meal intake box from a direction opposite the deflector slide.

* * * * *